(No Model.)
J. DAKERS.
AXLE BOX.
No. 301,867. Patented July 15, 1884.
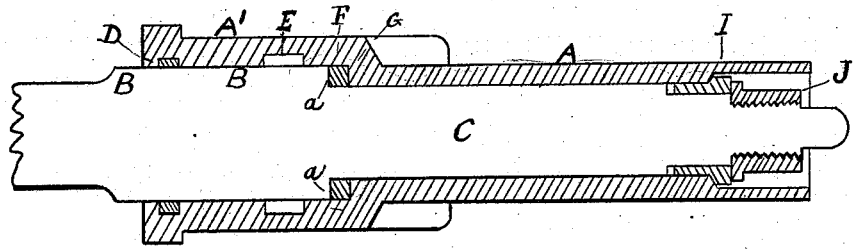
Witnesses
K. Smiley
G. Ross
Inventor
James Dakers
per Septimus Prince
Attorney

UNITED STATES PATENT OFFICE.

JAMES DAKERS, OF ABERDEEN, SCOTLAND.

AXLE-BOX.

SPECIFICATION forming part of Letters Patent No. 301,867, dated July 15, 1884.

Application filed June 6, 1883. (No model.) Patented in England September 25, 1880, No. 3,895, and December 20, 1882, No. 6,071.

*To all whom it may concern:*

Be it known that I, JAMES DAKERS, a subject of the Queen of Great Britain, residing at Aberdeen, Scotland, have invented new and useful Improvements in Carriage and Wagon Axle Bushes and in Fittings for Same, (for which I have obtained a patent in Great Britain, No. 6,071, bearing date December 20, 1882,) of which the following is a specification.

My invention relates to certain improvements, more particularly as regards the arrangement and combination of heretofore-used parts, in bushes for carriage and wagon axles and in fittings for same, which are designed to render such more simple in construction and cheaper in cost of manufacture, more durable, and more easily repaired than as hitherto constructed and fitted. I attain these results by the arrangement of bush and fittings illustrated in the accompanying drawing, in which the figure is a longitudinal section of bush and axle and fittings according to my invention.

A is the bush proper; A', an addition to same, formed in one piece with it and bored smooth internally, so as to revolve round axle-arm B, which it supports along its length, for which purpose the arm B is made as a bearing-surface. The mouth of A', I make rather stouter than other part for strength.

C is a journal of ordinary construction.

D is a leather or other washer or packing let into a groove or suitable receptacle in A'.

E is a groove for oil or other lubricant.

F is a leather washer on the journal for shoulder *a* to bear against inner bearing, G, of bush.

It is well known to coach-builders and axle-makers that axles as now constructed and fitted usually break at the shoulder *a*, and to strengthen the axle at this part various arrangements of bush and axle have been proposed; but these have hitherto produced a complicated, cumbersome, and expensive form of bush and axle, possessing few advantages and many serious defects, notably the external size of bush, which requires so much wood to be removed from the hub of the wheel when fitting it in as to seriously weaken the wheel, whereas by my invention this objection is entirely obviated.

I have found by experiments that the shoulder *a* must pass a considerable distance into the bush farther than has hitherto been proposed, and also that the axle-arm requires to be very firmly supported along its length, or it will soon cease to run smooth and begin to wear and rattle in the bush. The oil-chamber E is formed, as shown, behind the shoulder *a*, and this is an important element, as without such it is impossible to lubricate the arm B; and the washer or packing D must fit in the part A' and round the axle-arm B sufficiently close to prevent escape of oil from this part. The bush is retained on the axle by a suitable bearing-collar, I, which is held up to its place by nut J. The latter may be prevented from unscrewing by any known mechanical means. The end of the bush is inclosed by the usual oil-cap.

I am aware that prior to my invention it has been proposed to make the axle-arm of larger diameter than the journal part, and to form such arm as a bearing-surface; also, to form the shoulder *a* at the end of such an arm; also, that it has been proposed to employ a band round the axle-arm and held in the bush to prevent the entrance of dirt. I therefore make no claim to the use of these parts separately; but I consider that by the arrangement and combination of parts in the manner hereinbefore described I have devised a new and improved construction of bush and axle, which, from its simplicity, cheapness, and durability, possesses many advantages over any kind of bush and axle now in use.

What I claim as my invention, and desire to secure by Letters Patent of the United States, is—

In an axle and bush, the combination of bush A, support A', bearing-surface arm B, journal C, packing D, oil-chamber E, shoulder *a*, washer F, bearing G, collar I, and nut or equivalent J, for the purposes specified.

JAMES DAKERS.

Witnesses:
ALEXANDER COLVIN,
   7 *Union Wynd, Aberdeen.*
ALEXANDER TOCHER,
   26 *Chattan Place, Aberdeen.*